(12) United States Patent
Gilliard

(10) Patent No.: US 6,866,462 B2
(45) Date of Patent: Mar. 15, 2005

(54) FLEXIBLE PEDESTAL FOR INVERTING SOFT CONTACT LENSES

(75) Inventor: Allen Gilliard, Buford, GA (US)

(73) Assignee: Norortis AG, Basel (CH)

( * ) Notice: Subject to any disclaimer, the term of this patent is extended or adjusted under 35 U.S.C. 154(b) by 199 days.

(21) Appl. No.: 10/152,941

(22) Filed: May 22, 2002

(65) Prior Publication Data

US 2002/0185758 A1 Dec. 12, 2002

Related U.S. Application Data

(60) Provisional application No. 60/292,971, filed on May 23, 2001, and provisional application No. 60/325,133, filed on Sep. 26, 2001.

(51) Int. Cl.[7] ............................................. B65B 63/00
(52) U.S. Cl. .................... 414/405; 414/755; 414/758; 414/759; 414/773
(58) Field of Search ............................... 414/405, 755, 414/758, 759, 771, 773

(56) References Cited

U.S. PATENT DOCUMENTS 6,540,472 B2 * 4/2003 Ewaschuk .................... 414/771
6,543,984 B1 * 4/2003 Hovey et al. ................ 414/405

* cited by examiner

*Primary Examiner*—Donald W. Underwood
(74) *Attorney, Agent, or Firm*—Jian S. Zhou; Rob Gorman; R. Scott Moore

(57) ABSTRACT

A pedestal for inverting a soft contact lens has been invented. The pedestal of the invention has an inner surface, an outer surface, a dome shape capable of supporting the back surface of the contact lens or the front surface of that contact lens which has been inverted, is made from an elastic material which allows a negative pressure gradient to be generated from the outer surface to the inner surface, and has an elastic top which is capable of collapsing in to invert the contact lens.

7 Claims, 2 Drawing Sheets

FLEXIBLE PEDESTAL FOR INVERTING SOFT CONTACT LENSES

This application claims the benefits under 35 U.S.C. §119(e) of U.S. Provisional Patent Application Nos. 60/292,971 filed May 23, 2001 and 60/325,133 filed Sep. 26, 2001.

BACKGROUND

In the production of some soft contact lenses, both optical surfaces of those lenses need to be treated. In general, only one optical surface of those lenses can be treated at one time. For a better quality control of the surface treatment, it is preferable that a contact lens could be inverted so that the opposite surface could be treated under significantly similar conditions (e.g., in the same orientation). The object of the present invention is to develop a device and method for inverting a contact lens.

SUMMARY OF THE INVENTION

An embodiment of the present invention is a flexible porous pedestal for inverting soft contact lenses. The pedestal of the present invention has an inner surface and an outer surface and a dome shape capable of supporting the back surface of a contact lens or the front surface of that contact lens which has been inverted. The pedestal of the present invention is made from porous elastic materials which allow a negative pressure gradient to be generated from the outer surface to the inner surface. The negative pressure is served as means for keeping the contact lens secured to the pedestal. The top of the pedestal of the present invention is capable of collapsing in by any physical means.

Another embodiment of the present invention is a method for inverting a soft contact lens, the method comprising placing the contact lens on a pedestal of the present invention wherein the back surface of the contact lens is against the top outer surface of the pedestal; generating a first negative pressure gradient from the outer surface to the inner surface to keep the lens secured to the pedestal; and collapsing the top of the pedestal in by physically pushing or by physically pulling or by a second negative pressure gradient from the outer surface to the inner surface of the pedestal to invert the contact lens.

DETAILED DESCRIPTION OF THE PREFERRED EMBODIMENTS

Figure 1:
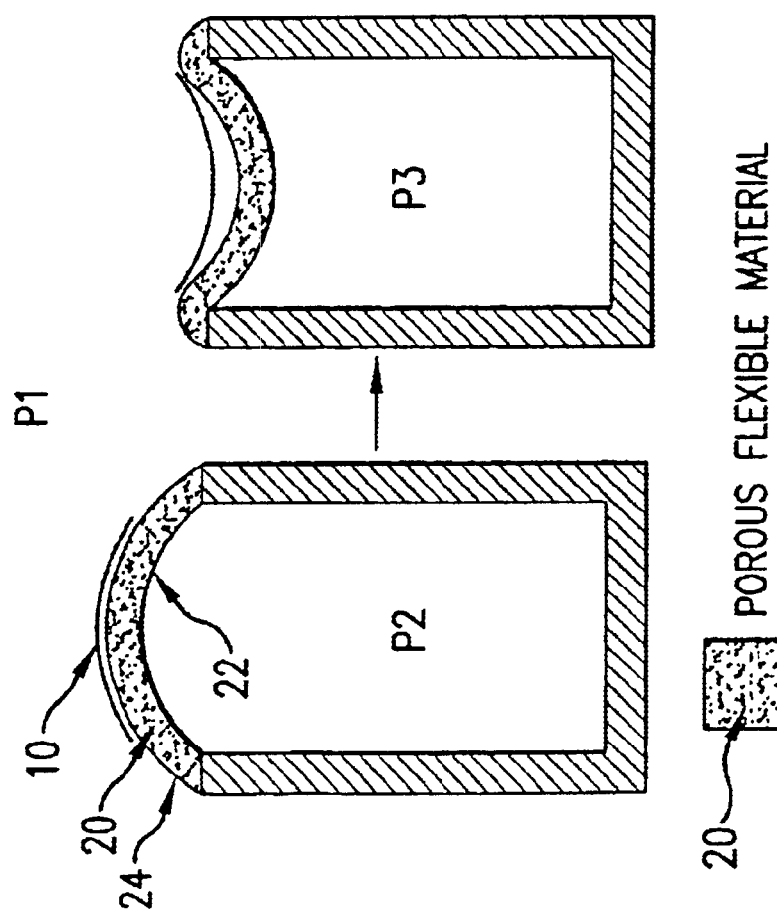
FIG. 1 schematically represents a pedestal for inverting a soft contact lens according to a preferred embodiment of the present invention.
Figure 2:
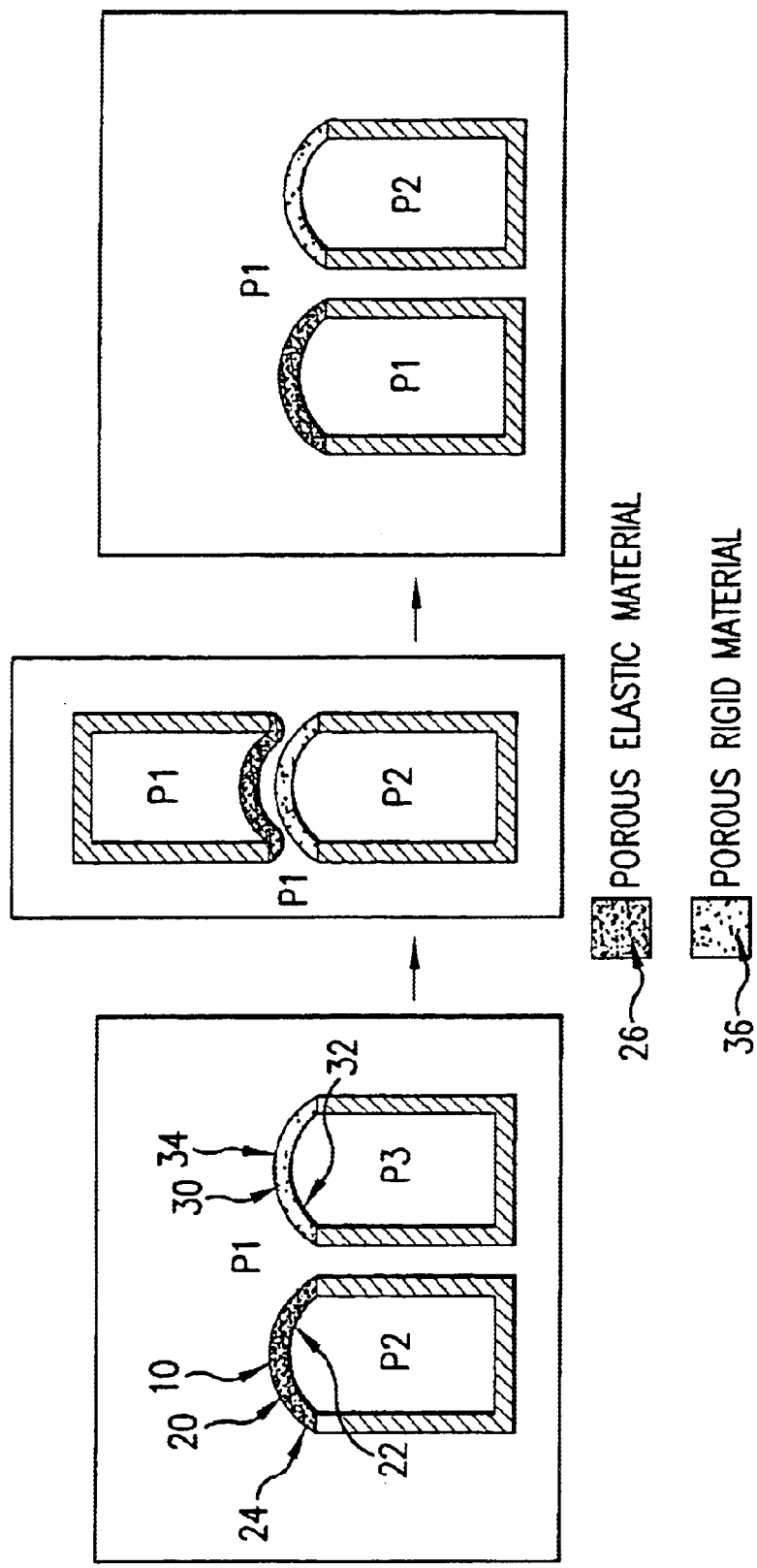
FIG. 2 schematically represents a system for inverting a soft contact lens according to a preferred embodiment of the present invention.

A contact lens has a back surface and opposite front surface. The back surface of a contact lens has a concave curvature and the front surface has a convex curvature.

"A contact lens that has been inverted" refers to a contact lens in a temporary state where the front surface of the contact lens is forced to have a concave curvature and the back surface is forced to have a convex curvature.

Drawing 1 schematically illustrates a pedestal and method for inverting a soft contact lens according to a preferred embodiment of the present invention. A soft contact lens 10 is placed on the top of a pedestal 20. The pedestal 20 has an inner surface 22, an outer surface 24 and a dome shape. The pedestal 20 is made from a porous flexible material 26. The lens 10 is secured onto the pedestal 20 by a negative pressure gradient from the outer surface 24 to the inner surface 22 of the pedestal (i.e., PI>P2 and P1>P3). The top of the pedestal 20 is capable of collapsing in by a larger negative pressure gradient or physically pulling or pushing and thereby inverting the contact lens 10.

Drawing 2 schematically illustrates a system and method for inverting a soft contact lens according to a preferred embodiment of the present invention. The system of the present invention comprises a first pedestal 20 and a second pedestal 30. The first pedestal 20 has a first inner surface 22, a first outer surface 24 and a dome shape. The pedestal 20 is made from a porous flexible material 26. The top of the pedestal 20 is capable of collapsing in by a larger negative pressure gradient or physically pulling or pushing and thereby inverting the contact lens 10. The second pedestal 30 has a second inner surface 32, a second outer surface 34 and a dome shape. The second pedestal 30 is made from a porous rigid material 36. A soft contact lens 10 is first placed on the first pedestal 20 and secured to the first pedestal 20 by a first pressure gradient (PI>P2). The first pedestal 20 is then pressed onto the top of the second pedestal 30 and the lens is inverted. A second pressure gradient is generated while at the same time eliminating the first negative pressure gradient, to transfer and secure the contact lens 10 to the second pedestal 30. This process can invert and transfer a soft contact lens from one pedestal to another pedestal.

What is claimed is:

1. A pedestal for inverting a soft contact lens, wherein said pedestal has an inner surface, an outer surface and a porous and elastic dome with a shape capable of supporting the back surface of the contact lens or the front surface of the contact lens that has been inverted, wherein said pedestal is capable of allowing a negative pressure gradient to be generated from the outer surface to the inner surface, and wherein the porous and elastic dome is capable of collapsing in to permit the inverting of the contact lens.

2. A pedestal of claim 1, wherein the negative pressure gradient is generated by a vacuum pump.

3. A system for inverting a soft contact lens, wherein said system comprising:

1) a first pedestal, wherein said first pedestal has a first inner surface, a first outer surface and a porous and elastic dome with a shape capable of supporting the back surface of the contact lens or the front surface of the contact lens that has been inverted, wherein said first pedestal is capable of allowing a first negative pressure gradient to be generated from the first outer surface to the first inner surface, wherein the first negative pressure gradient secures the contact lens to the first pedestal, and wherein the porous and elastic dome is capable of collapsing in to permit the inverting of the contact lens; and 2) a second pedestal which is used for pushing-in the first porous and elastic dome so as to permit the inverting of the contact lens, wherein said second pedestal is rigid and has a second inner surface, a second outer surface and a porous and rigid dome with a shape capable of supporting the front surface of the contact lens that has been inverted or the back surface of the contact lens, wherein said second pedestal is capable of allowing a second negative pressure gradient to be generated from the second outer surface to the second inner surface, wherein the second negative pressure gradient secures the contact lens to the second pedestal, wherein the pushing-in of the first dome is achieved by placing the second rigid dome resting against the first elastic dome and applying a positive pressure through the second pedestal onto the first elastic dome with the contact lens to be inverted.

4. A system of claim 3, wherein the system further comprises a vacuum system which is connected to the first pedestal and the second pedestal to generate the first and second negative pressure gradients.

5. A method for inverting a soft contact lens, the method comprising:
   1) placing the contact lens on a first pedestal, wherein the first pedestal: a) has a first inner surface, a first outer surface and a first porous and elastic dome with a shape capable of supporting the back surface of the contact lens or the front surface of the contact lens that has been inverted and b) is capable of allowing a first negative pressure gradient to be generated from the first outer surface to the first inner surface of the first dome, wherein the negative pressure gradient is capable of securing the contact lens on the first dome, wherein the first dome is capable of collapsing in to permit the inverting of the contact lens;
   2) generating a first negative pressure gradient from the first outer surface to the first inner surface of the first pedestal to keep the lens secured to the first dome;
   3) collapsing in the first porous and elastic dome by physically pushing of the first dome or by a second negative pressure gradient generated from the outer surface to the inner surface of the first dome, wherein the second negative pressure gradient is larger than the first negative pressure gradient; and
   4) transferring the contact lens inverted in step 3 onto a second pedestal, wherein the second pedestal has a second outer surface the curvature of which is capable of accommodating the back surface of the contact lens or the front surface of the contact lens that has been inverted.

6. A method of claim 5, wherein the top of the pedestal is collapsed in by physically pushing with the second pedestal.

7. A method of claim 6, wherein said second pedestal is rigid and has a second inner surface and a second porous and rigid dome, and wherein a third negative pressure gradient can be generated from the second outer surface to the second inner surface, wherein the third negative pressure gradient secures the contact lens to the second pedestal.

* * * * *